(12) United States Patent
Naber

(10) Patent No.: US 12,169,550 B2
(45) Date of Patent: Dec. 17, 2024

(54) METHODS FOR IMPROVED SECURITY FOR PERSONAL IDENTIFICATION NUMBER (PIN) TRANSACTIONS AND DEVICES THEREOF

(71) Applicant: JPMorgan Chase Bank, N.A., New York, NY (US)

(72) Inventor: Michael H. Naber, Wilmington, DE (US)

(73) Assignee: JPMORGAN CHASE BANK, N.A., New York, NY (US)

(*) Notice: Subject to any disclaimer, the term of this patent is extended or adjusted under 35 U.S.C. 154(b) by 599 days.

(21) Appl. No.: 16/577,239

(22) Filed: Sep. 20, 2019

(65) Prior Publication Data

US 2020/0104480 A1 Apr. 2, 2020

Related U.S. Application Data

(60) Provisional application No. 62/738,634, filed on Sep. 28, 2018.

(51) Int. Cl.

| | |
|---|---|
| *G06Q 20/40* | (2012.01) |
| *G06F 21/45* | (2013.01) |
| *G06Q 20/36* | (2012.01) |
| *H04L 9/32* | (2006.01) |
| *H04L 9/40* | (2022.01) |

(52) U.S. Cl.
CPC ......... *G06F 21/45* (2013.01); *G06Q 20/3678* (2013.01); *H04L 9/3226* (2013.01); *H04L 63/083* (2013.01); *H04L 63/0853* (2013.01); *H04L 63/123* (2013.01); *G06Q 2220/00* (2013.01)

(58) Field of Classification Search
CPC ...... G06Q 20/409; G06Q 20/20; G06F 21/45; G06F 21/31; H04L 63/12
See application file for complete search history.

(56) References Cited

U.S. PATENT DOCUMENTS

| | | |
|---|---|---|
| 5,319,710 A | 6/1994 | Atalla et al. |
| 6,811,082 B2 | 11/2004 | Wong |
| 10,366,378 B1 * | 7/2019 | Han ..................... G06Q 20/425 |
| 2002/0123972 A1 * | 9/2002 | Hodgson ................ G06Q 20/12 713/153 |

(Continued)

OTHER PUBLICATIONS

Rajarajan et al., SpinPad: A Secured PIN Number Based User authentication Scheme, Sep. 10-11, 2018, 2018 International Conference on Recent Trends in Advance Computing (ICRTAC), IEEE Xplore, pp. 53-59 (Year: 2018).*

(Continued)

*Primary Examiner* — Patrick McAtee
*Assistant Examiner* — Sima Asgari
(74) *Attorney, Agent, or Firm* — Greenblum & Bernstein, P.L.C.

(57) ABSTRACT

A method for authenticating a transaction that requires the use of a personal identification number (PIN) is provided. The method includes obtaining chip information from a chip that is embedded in a card; receiving a user input that includes the PIN; combining the PIN with the chip information; performing a message authentication code (MAC) operation on the combination in order to generate an application request cryptogram (ARQC); and requesting an authentication of the transaction based on the generated ARQC.

12 Claims, 5 Drawing Sheets

(56) References Cited

U.S. PATENT DOCUMENTS

| | | | |
|---|---|---|---|
| 2004/0118930 A1* | 6/2004 | Berardi | G06Q 20/00 235/492 |
| 2005/0004876 A1* | 1/2005 | Movalli | G06Q 30/06 705/64 |
| 2007/0011099 A1 | 1/2007 | Sheehan | |
| 2007/0143227 A1* | 6/2007 | Kranzley | G06Q 20/02 705/67 |
| 2008/0189214 A1 | 8/2008 | Mueller | |
| 2009/0185677 A1 | 7/2009 | Bugbee | |
| 2010/0179909 A1* | 7/2010 | Dana | G06Q 20/3674 705/50 |
| 2011/0047036 A1 | 2/2011 | Foran-Owens | |
| 2013/0247173 A1* | 9/2013 | Jakobsson | H04L 63/083 726/18 |
| 2014/0156535 A1* | 6/2014 | Jabbour | G06Q 20/34 705/72 |
| 2015/0039898 A1* | 2/2015 | kowalski | H04L 9/3226 713/184 |
| 2015/0120472 A1* | 4/2015 | Aabye | G06Q 20/36 705/16 |
| 2016/0012445 A1* | 1/2016 | Villa-Real | G06Q 20/4016 705/44 |
| 2016/0028715 A1* | 1/2016 | Sivashanmugam | H04L 63/0861 726/7 |
| 2016/0048836 A1* | 2/2016 | Sabatier | G06Q 20/3829 705/44 |
| 2016/0071081 A1* | 3/2016 | Zheng | H04L 9/3247 705/72 |
| 2016/0125396 A1* | 5/2016 | Brickell | G06Q 20/382 705/67 |
| 2016/0335636 A1* | 11/2016 | Shao | G06Q 20/20 |
| 2016/0379183 A1* | 12/2016 | Holman | G06Q 20/04 705/44 |
| 2017/0250810 A1 | 8/2017 | Guohua | |
| 2017/0255932 A1* | 9/2017 | Aabye | G06Q 20/38215 |
| 2017/0300889 A1* | 10/2017 | Watanabe | G06Q 20/209 |
| 2018/0047023 A1 | 2/2018 | Bouda | |
| 2018/0144339 A1* | 5/2018 | Beidas | G06Q 20/40 |
| 2018/0150836 A1* | 5/2018 | Kumar | G06Q 20/38215 |
| 2018/0276666 A1* | 9/2018 | Haldenby | H04L 9/3268 |
| 2019/0362334 A1* | 11/2019 | Wang | G06Q 20/327 |

OTHER PUBLICATIONS

International Search Report and Written Opinion in corresponding International Patent Application No. PCT/US2019/052183, Dec. 4, 2019.

Extended European Search Report in corresponding European Patent Application No. 19866424.5, dated May 19, 2022.

* cited by examiner

METHODS FOR IMPROVED SECURITY FOR PERSONAL IDENTIFICATION NUMBER (PIN) TRANSACTIONS AND DEVICES THEREOF

CROSS-REFERENCE TO RELATED APPLICATIONS

This application claims the benefit of U.S. Provisional Patent Application Ser. No. 62/738,634, filed Sep. 28, 2018, which is hereby incorporated by reference in its entirety.

BACKGROUND

1. Field of the Disclosure

This technology generally relates to methods and systems for authenticating a transaction, and more particularly, to methods and systems for authenticating a transaction that requires the use of a personal identification number (PIN) while protecting the PIN from potential exposure, thereby improving security and privacy.

2. Background Information

In many instances, a transaction requires the use of a personal identification number (PIN) to authenticate the transaction and to provide security with respect to the transaction. For example, many transactions that are implemented by using a card, such as a debit card that includes an embedded chip circuit, may use a chip-and-PIN authentication that requires a PIN in order to complete the transaction.

If specific information that pertains to such a transaction is compromised, there may be significant adverse consequences to a person to whom the PIN relates, such as identity theft and/or theft of funds from a personal account. For this reason, protecting personal information is very important for personal financial security. Moreover, since the PIN is a personal identification number relating to a person, and since step S4 in FIG. 4 and data flow (2) in FIG. 5 disclose that the personal identification number is received by user input into a point-of-sale terminal 504 using a keypad, the personal identification number is a user-identifying, keypad-inputted number.

One way to reduce the likelihood of exposing a PIN to a potential compromise is to minimize the number of transmissions of the PIN information. Accordingly, there is a need to provide a method for authenticating a transaction that requires the use of a PIN while protecting the PIN from potential exposure, thereby improving security and privacy.

SUMMARY

The present disclosure, through one or more of its various aspects, embodiments, and/or specific features or sub-components, provides, inter alia, various systems, servers, devices, methods, media, programs, and platforms for authenticating a transaction that requires the use of a personal identification number (PIN) while protecting the PIN from potential exposure.

According to an aspect of the present disclosure, a method for authenticating a transaction that requires the use of a personal identification number (PIN) is provided. The method is implemented by at least one processor. The method includes: receiving, by the at least one processor, a request for executing a transaction using a card that includes an embedded chip; obtaining, by the at least one processor, chip information from the embedded chip; receiving, by the at least one processor, a user input that includes the PIN; combining the PIN with the chip information; using a result of the combining to generate a transaction-specific code; and requesting an authentication of the transaction based on the generated transaction-specific code.

The using the result of the combining to generate the transaction-specific code may include: determining a first number of characters included in the result of the combining; when the determined number of characters is less than a predetermined number, adding at least one character to the result of the combining such that a resultant character sequence has a second number of characters that is equal to the predetermined number; and performing a message authentication code (MAC) operation with respect to the resultant character sequence in order to generate the transaction-specific code.

The predetermined number may be a multiple of 16.

The transaction-specific code may include an application request cryptogram (ARQC).

The chip information may include at least one of information that relates to a transaction date, information that relates to a transaction type, information that relates to a currency code, and information that relates to a transaction amount.

The chip information may further include card-specific information.

The requesting the authentication of the transaction may include transmitting the chip information and the generated transaction-specific code to a verification server and receiving a response from the verification server.

When the transmitted chip information is used by the verification server to generate a verification code that matches with the transmitted transaction-specific code, the received response may include an indication that the transaction is authenticated. When the transmitted chip information is used by the verification server to generate a verification code that does not match with the transmitted transaction-specific code, the received response may include an indication that the transaction is not authenticated.

According to another aspect of the present disclosure, a point-of-sale terminal apparatus configured to implement an execution of a method for authenticating a transaction that requires the use of a personal identification number (PIN) is provided. The point-of-sale apparatus includes a processor, a memory, and a communication interface coupled to each of the processor and the memory. The processor is configured to: receive, via the communication interface, a request for executing a transaction using a card that includes an embedded chip; obtain chip information from the embedded chip; receive, via the communication interface, a user input that includes the PIN; combine the PIN with the chip information; receive, from the chip, a transaction-specific code; and request an authentication of the transaction based on the generated transaction-specific code.

The processor may be further configured to: determine a first number of characters included in the result of the combining; and when the determined number of characters is less than a predetermined number, add at least one character to the result of the combining such that a resultant character sequence has a second number of characters that is equal to the predetermined number.

The predetermined number may be a multiple of 16.

The transaction-specific code may include an application request cryptogram (ARQC).

The chip information may include at least one of information that relates to a transaction date, information that relates to a transaction type, information that relates to a currency code, and information that relates to a transaction amount.

The chip information may further include card-specific information.

The processor may be further configured to transmit, via the communication interface, the chip information and the generated transaction-specific code to a verification server and to receive, via the communication interface, a response from the verification server.

According to another aspect of the present disclosure, a verification server apparatus configured to implement an execution of a method for authenticating a transaction that requires the use of a personal identification number (PIN) is provided. The verification server apparatus includes a processor, a memory, and a communication interface coupled to each of the processor and the memory. The processor is configured to: receive, via the communication apparatus, a request for authenticating a transaction using a card that includes an embedded chip, the request including chip information obtained from the embedded chip and a transaction-specific code; retrieve, from the memory, information that is usable for generating PIN information that relates to the card; combine the retrieved PIN information with the chip information; use a result of the combining to generate a verification code; and determine whether the generated verification code matches with the received transaction-specific code. When the generated verification code is determined to match with the received transaction-specific code, the processor is further configured to transmit, to a point-of-sale terminal a message that indicates that the transaction is authenticated. When the generated verification code is determined to not match with the received transaction-specific code, the processor is further configured to transmit, to the point-of-sale terminal, a message that indicates that the transaction is not authenticated.

The processor may be further configured to perform a message authentication code (MAC) operation with respect to the result of the combining in order to generate the verification code.

The verification code may include an application request cryptogram (ARQC).

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
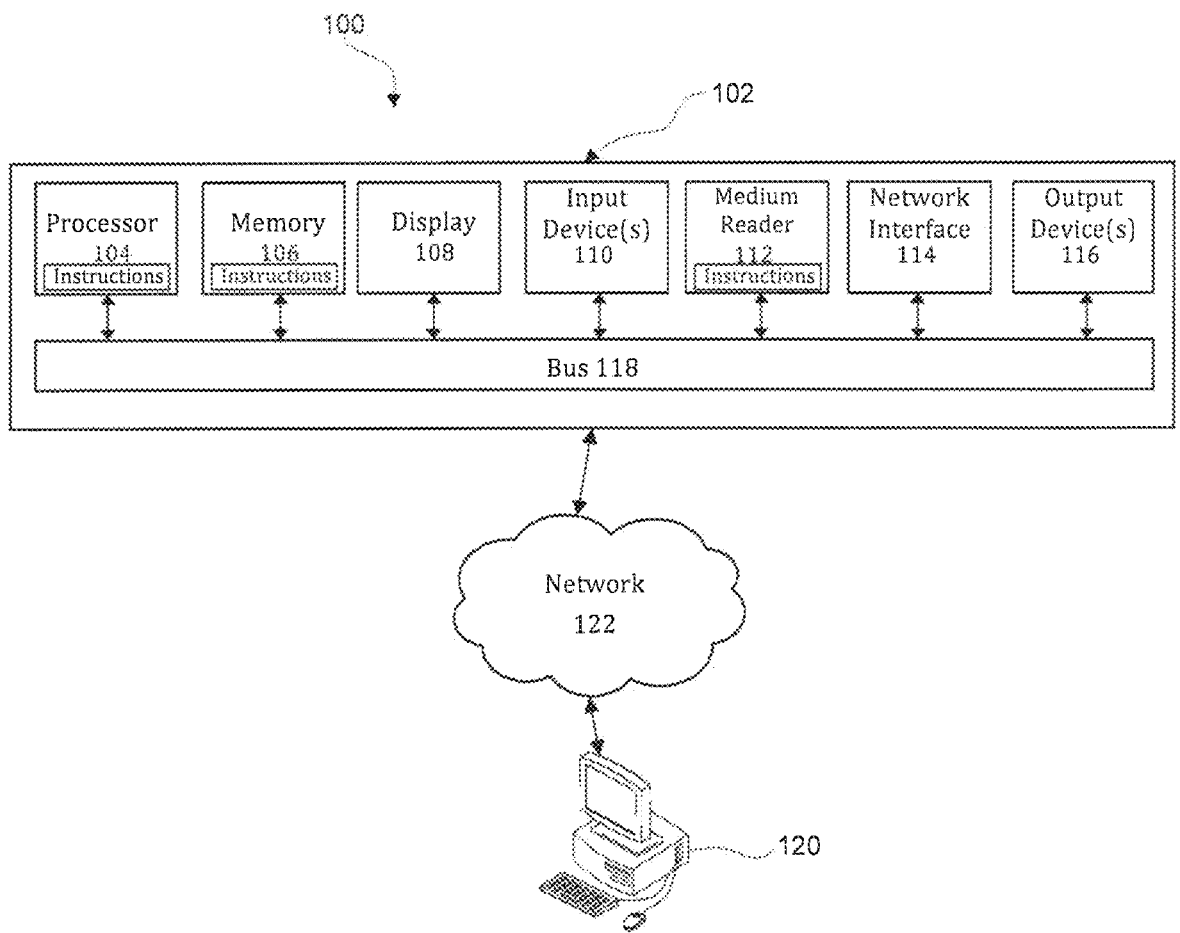
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized methods and systems for authenticating a transaction that requires the use of a personal identification number (PIN) while protecting the PIN from potential exposure, thereby improving security and privacy.

Figure 2:
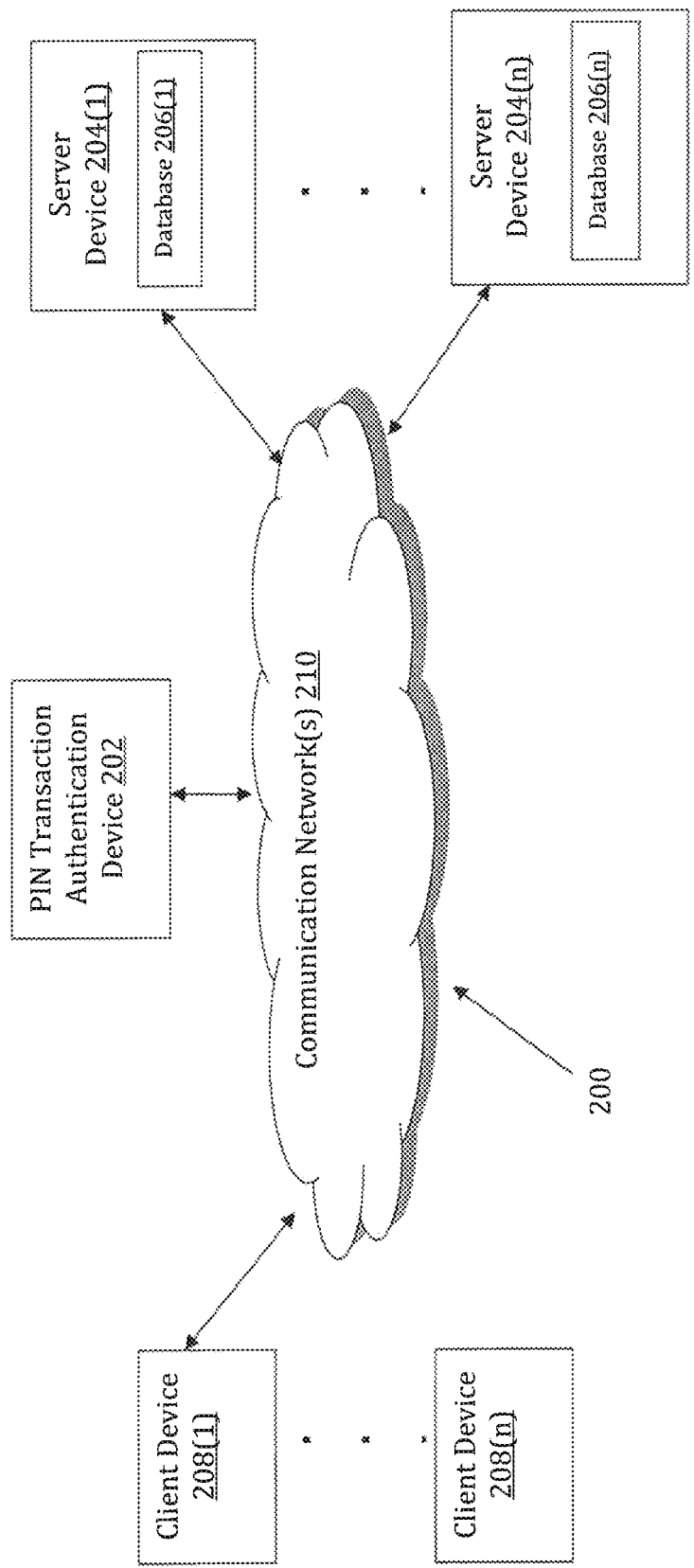
FIG. 2 illustrates an exemplary diagram of a network environment.

Referring to FIG. 2, a schematic of an exemplary network environment 200 for implementing a method for authenticating a transaction that requires the use of a personal identification number (PIN) while protecting the PIN from potential exposure is illustrated. In an exemplary embodiment, the method is executable on any networked computer platform, such as, for example, a personal computer (PC).

The method for authenticating a transaction that requires the use of a personal identification number (PIN) while protecting the PIN from potential exposure may be implemented by a PIN Transaction Authentication (PTA) device 202. The PTA device 202 may be the same or similar to the computer system 102 as described with respect to FIG. 1. The PTA device 202 may store one or more applications that can include executable instructions that, when executed by the PTA device 202, cause the PTA device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the PTA device 202 itself, may be located in virtual server(s) running in a cloud-based computing environment rather than being tied to one or more specific physical network computing devices. Also, the application(s) may be running in one or more virtual machines (VMs) executing on the PTA device 202. Additionally, in one or more embodiments of this technology, virtual machine(s) running on the PTA device 202 may be managed or supervised by a hypervisor.

In the network environment 200 of FIG. 2, the PTA device 202 is coupled to a plurality of server devices 204(1)-204(n) that hosts a plurality of databases 206(1)-206(n), and also to a plurality of client devices 208(1)-208(n) via communication network(s) 210. A communication interface of the PTA device 202, such as the network interface 114 of the computer system 102 of FIG. 1, operatively couples and communicates between the PTA device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the PTA device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and PTA devices that efficiently implement a method for authenticating a transaction that requires the use of a personal identification number (PIN) while protecting the PIN from potential exposure, thereby improving security and privacy.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The PTA device 202 may be a standalone device or integrated with one or more other devices or apparatuses, such as one or more of the server devices 204(1)-204(n), for example. In one particular example, the PTA device 202 may include or be hosted by one of the server devices 204(1)-204(n), and other arrangements are also possible. Moreover, one or more of the devices of the PTA device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the PTA device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store card-specific information, merchant data, transactional data, data that relates to a financial institution, and any other data that relates to performing a transaction.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the PTA device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the PTA device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the PTA device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the PTA device 202, the server devices 204(1)-204(n), or the client devices 208(1)-208(n), for example, may be configured to operate as virtual instances on the same physical machine. In other words, one or more of the PTA device 202, the server devices 204(1)-204(n), or the client devices 208(1)-208(n) may operate on the same physical device rather than as separate devices communicating through communication network(s) 210. Additionally, there may be more or fewer PTA devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
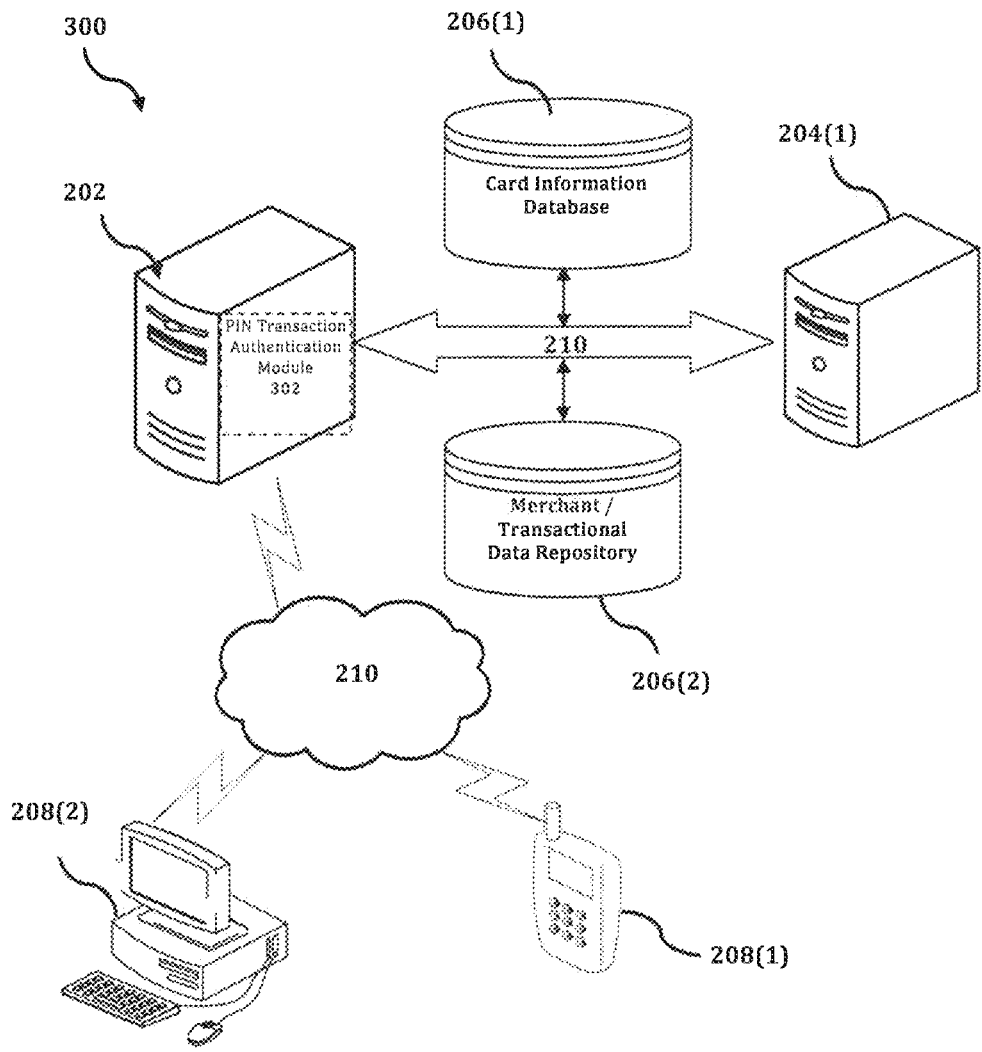
FIG. 3 shows an exemplary system for implementing a method for authenticating a transaction that requires the use of a personal identification number (PIN) while protecting the PIN from potential exposure.

The PTA device 202 is described and shown in FIG. 3 as including a PIN transaction authentication module 302, although it may include other rules, policies, modules, databases, or applications, for example. As will be described below, the PIN transaction authentication module 302 is configured to implement a method for authenticating a transaction that requires the use of a personal identification number (PIN) while protecting the PIN from potential exposure, thereby improving security and privacy. In an exemplary embodiment, the PIN transaction authentication module 302 is implemented on the chip of a card that is usable by a consumer for executing a transaction.

An exemplary process 300 for implementing a mechanism for authenticating a transaction that requires the use of a personal identification number (PIN) while protecting the PIN from potential exposure by utilizing the network environment of FIG. 2 is shown as being executed in FIG. 3. Specifically, a first client device 208(1) and a second client device 208(2) are illustrated as being in communication with PTA device 202. In this regard, the first client device 208(1) and the second client device 208(2) may be "clients" of the PTA device 202 and are described herein as such. Nevertheless, it is to be known and understood that the first client device 208(1) and/or the second client device 208(2) need not necessarily be "clients" of the PTA device 202, or any entity described in association therewith herein. Any additional or alternative relationship may exist between either or both of the first client device 208(1) and the second client device 208(2) and the PTA device 202, or no relationship may exist.

Further, PTA device 202 is illustrated as being able to access a card information database 206(1) and a merchant/transactional data repository 206(2). The PIN transaction authentication module 302 may be configured to access these databases for implementing a method for authenticating a transaction that requires the use of a personal identification number (PIN) while protecting the PIN from potential exposure, thereby improving security and privacy.

Still further, PTA device 202 is illustrated as being in communication with at least one server device 204(1). In an exemplary embodiment, referring also to FIG. 5, the PTA device 202 may be equivalent to acquirer device 506, and the server devices 204(1)-(n) may include a payment network server device 508 and an issuer server device 510.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the PTA device 202 via broadband or cellular communication. Of course, these embodiments are merely exemplary and are not limiting or exhaustive.

Upon being started, the PIN transaction authentication module 302 executes a process for authenticating a transaction that requires the use of a personal identification number (PIN) while protecting the PIN from potential exposure. An exemplary process for authenticating a transaction that requires the use of a personal identification number (PIN) while protecting the PIN from potential exposure is generally indicated at flowchart 400 in FIG. 4.

Figure 4:
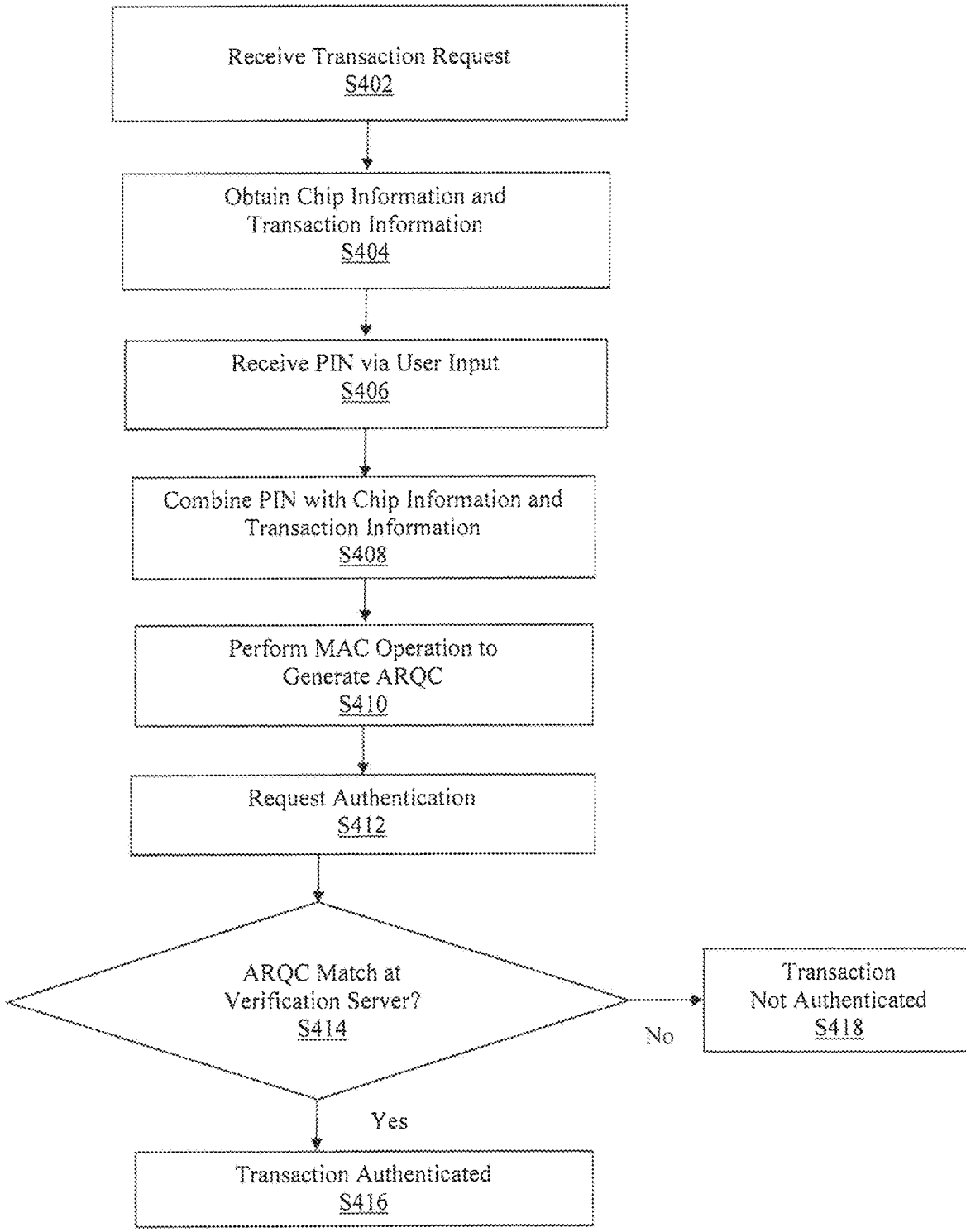
FIG. 4 is a flowchart of an exemplary process for implementing a method for authenticating a transaction that requires the use of a personal identification number (PIN) while protecting the PIN from potential exposure.
Figure 5:
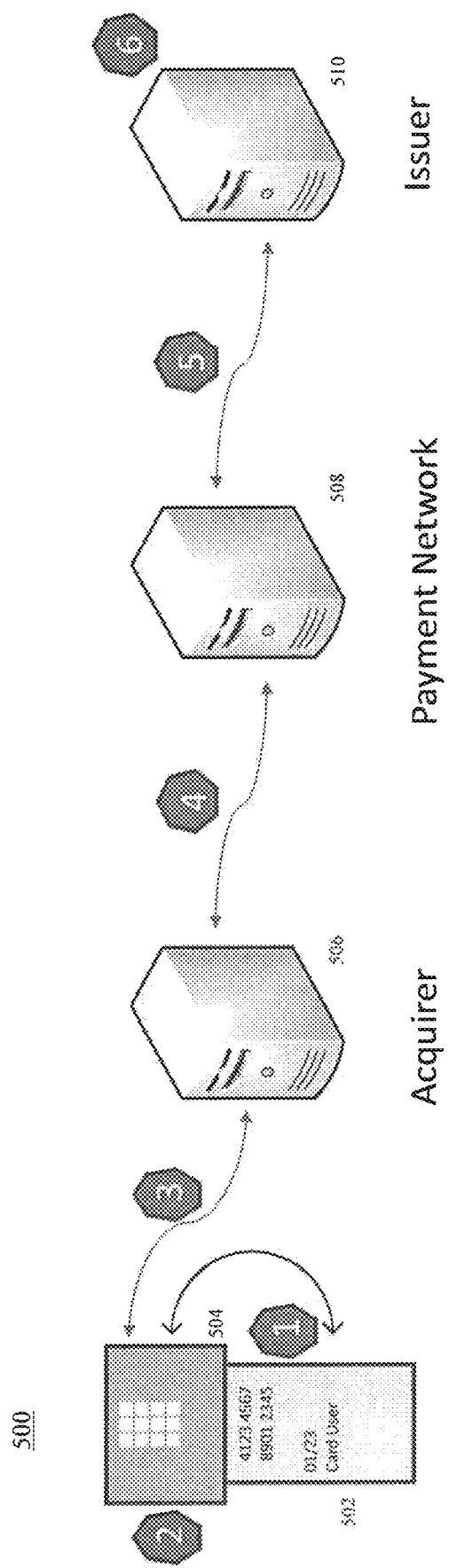
FIG. 5 is a data flow diagram that illustrates an interaction between a point-of-sale device and a verification server, according to an exemplary embodiment.

In the process 400 of FIG. 4, at step S402, a transaction request is received. Referring also to FIG. 5, in an exemplary embodiment, a consumer may wish to purchase goods from a merchant by using a card 502, such as a debit card, that uses a chip-and-PIN authentication method. As a result, the consumer may insert the card into a point-of-sale terminal 504 in order to effectuate the transaction request.

At step S404, information is obtained from the chip. In an exemplary embodiment, the chip is an integrated circuit chip that is embedded in the card 502, and the point-of-sale terminal 504 is configured to access the chip in order to obtain card-specific information. In addition, transaction information is also obtained by the point-of-sale terminal. The transaction information may include any one or more of a transaction date, a transaction type, a currency code, and a transaction amount.

At step S406, PIN information is received via a user input. In an exemplary embodiment, the point-of-sale terminal 504 displays a message to prompt the consumer to enter a PIN, and the consumer then enters a numeric code into the point-of-sale terminal 504 by using a keypad input mechanism.

At step S408, the PIN information is combined with the chip information and the transaction information. In an exemplary embodiment, the PIN transaction authentication module 302 converts the obtained chip information and transaction information into a string of numeric characters and then concatenates the PIN onto the string.

At step S410, the resulting numeric string is used as an input to an algorithm that generates a transaction-specific code. In an exemplary embodiment, the algorithm is a message authentication code (MAC) algorithm, and the execution of the MAC operation generates an application request cryptogram (ARQC). In an exemplary embodiment, the MAC algorithm may require an input for which the number of numeric characters is a multiple of 16, and therefore, the PIN authentication module 302 may add dummy characters to the numeric string in order to ensure that the number of numeric characters is a multiple of 16.

At step S412, a request to authenticate the transaction is made by transmitting the transaction information and the transaction-specific code to a verification server. In an exemplary embodiment, the PIN authentication module 302 transmits the chip information, the transaction information, and the generated ARQC from the acquirer device 506 to the payment network server device 508, which transmits the ARQC to the issuer server device 510, which acts as the verification server, in order to effectuate the request to authenticate the transaction. Importantly, the PIN information is not transmitted separately.

At step S414, the verification server uses the received chip information, the received transaction information, and the received ARQC to determine whether to authenticate the transaction. In an exemplary embodiment, the issuer server device 510 uses the chip information to retrieve the corresponding PIN information from card information database 206(1), and then generates an input to a MAC algorithm by concatenating the retrieved PIN information with the chip information and the transaction information.

The issuer server device 510 uses this input to independently generate an ARQC code and then compares the independently generated ARQC code with the received ARQC code. When there is a match, then the issuer server device 510 determines that the transaction should be authenticated (i.e., step S414: Yes), and proceeds to step S416, at which the transaction is authenticated. Conversely, when there is not a match, then the issuer server device 510 determines that the transaction should not be authenticated (i.e., step S414: No), and proceeds to step S418, at which the transaction is not authenticated.

Referring to FIG. 5, a data flow diagram 500 illustrates an interaction between a point-of-sale device and a verification server for performing a method for authenticating a transaction that requires the use of a personal identification number (PIN) while protecting the PIN from potential exposure, according to an exemplary embodiment. As illustrated in FIG. 5, a consumer presents or "dips" a card 502 that has an integrated circuit (i.e., a chip) embedded therein at a point-of-sale terminal 504, and in a first data flow (1), the chip and the point-of-sale terminal 504 establish communication therebetween by using asymmetric keys, thereby requesting that a transaction be executed.

In a second data flow (2), the consumer enters a PIN by using a keypad input device. In an exemplary embodiment, the PIN has been selected by the consumer upon issuance of the card 502. Upon receiving the PIN, the point-of-sale terminal 504 transmits the PIN to the chip.

The integrated circuit on the chip card then concatenates data associated with the transaction and the PIN and performs a cryptographic operation on the result of the concatenation using a card-specific key in order to generate a first ARQC. The data associated with the transaction may include, for example, any one or more of a transaction date, a transaction type, a currency code, a transaction amount, and any other suitable type of data that relates to the transaction. In an exemplary embodiment, when the card-specific key requires an input of a predetermined size, such as a multiple of 16, additional numeric characters may be provided together with the result of the concatenation, and then a message authentication code (MAC) operation is performed in order to generate an 8-byte binary cryptogram, i.e., the first ARQC.

In a third data flow (3), the point-of-sale terminal 504 transmits an authorization request that includes the first ARQC and all data elements used to generate the first ARQC other than the PIN to the acquirer server device 506. In this regard, the data elements are not required to be secured, and the ARQC is already encrypted, and thus, the PIN is not transmitted separately, thereby protecting the PIN from exposure along the data flow. Then, in a fourth data flow (4), the acquirer server device transmits the authorization request, including the data elements and the ARQC, to the payment network server device 508.

In a fifth data flow (4), the payment network server device 508 forwards the authorization request, including the data elements and the ARQC, to the issuer server device 510. Then, in a sixth data flow (6), the issuer server device 510 retrieves the PIN from memory and then processes the data elements together with the retrieved PIN in order to generate a second ARQC. In this manner, for any card 502 that was issued by the same financial institution that owns or controls the issuer server device 510, the PIN is known in advance as a result of the original establishment of the PIN upon issuance of the card 502, or as a result of a change in the PIN that may have occurred subsequently, and therefore, the PIN may be retrieved from memory without a need to expose the PIN to a network transmission.

The second ARQC is then compared to the first ARQC to determine whether there is a match. In this regard, a match indicates that the PIN entered by the consumer at data flow (2) is the same as the PIN retrieved by the issuer server device 510 at data flow (6). If there is a match between the first ARQC and the second ARQC, then the issuer server device 510 authenticates the transaction request. Conversely, if there is not a match between the first ARQC and the second ARQC, then the issuer server device 510 does not authenticate the transaction request, and in an exemplary embodiment, the issuer server device 510 may transmit a message to the point-of-sale terminal 504 indicating the requested transaction is not authorized.

Accordingly, with this technology, an optimized process for authenticating a transaction that requires the use of a personal identification number (PIN) while protecting the PIN from potential exposure, thereby improving security and privacy, is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for authenticating a transaction that requires the use of a personal identification number (PIN), the method being implemented by at least one processor, the method comprising:
   i) receiving, by at least one processor of a point-of-sale terminal, a request for executing a transaction using a card that includes an embedded chip, comprising:
      receiving the card at the point-of-sale terminal, and
      establishing a first data flow by establishing communication between the card and the point-of-sale terminal using asymmetric keys;
   ii) obtaining, by the at least one processor of the point-of-sale terminal, chip information from the embedded chip, the chip information being card-specific information;
   iii) receiving, by the at least one processor of the point-of-sale terminal, a user input via a keypad that includes at least the PIN identifying the user and input by the keypad in a second data flow;
   iv) transmitting the PIN from the point-of-sale terminal to the embedded chip of the card;
   v) combining, by the embedded chip of the card, the PIN with the chip information and transaction information about the executed transaction, the transaction information including a transaction date, a transaction type, a currency code, and a transaction amount;
   vi) generating, by the embedded chip of the card, a first transaction-specific cryptogram from the combination of the PIN, the chip information, and the transaction information prior to transmission by performing a message authentication code, denoted as a MAC code, operation on the combination;
   vii) transmitting, by the at least one processor of the point-of-sale terminal, in a third data flow, the first transaction-specific cryptogram, the chip information, and the transaction information to an acquirer server, and refraining from transmitting the PIN, separately from the first transaction-specific cryptogram;
   viii) transmitting, in a fourth data flow, an authorization request including the first transaction-specific cryptogram, the chip information, and the transaction information from the acquirer server to a payment network server, requesting an authorization of the transaction based on the generated first transaction-specific cryptogram;
   ix) forwarding, from the payment network server, to an issuer server, in a fifth data flow, the authorization request, the first transaction-specific cryptogram, the chip information, and the transaction information; and
   x) generating, by the issuer server, a sixth data flow including:
      retrieving from a memory of the issuer server, PIN information, identifying the user, corresponding to the chip information,
      generating a second transaction-specific cryptogram, independent of the generating of the first transaction-specific cryptogram, using the received chip information, the received transaction information, and the received PIN information retrieved from the card information database corresponding to the chip information of the issuer server, and
      authenticating the transaction when the first and second transaction-specific cryptograms match and the PIN entered in the second data flow is the same as the PIN information, retrieved by the issuer server in the sixth data flow.

2. The method of claim 1, wherein the using the result of the combining to generate the first transaction-specific cryptogram comprises:
   determining a first number of characters included in the result of the combining;
   when the determined number of characters is less than a predetermined number, adding at least one character to the result of the combining such that a resultant character sequence has a second number of characters that is equal to the predetermined number; and
   performing the message authentication code (MAC) operation with respect to the resultant character sequence in order to generate the first transaction-specific cryptogram.

3. The method of claim 2, wherein the predetermined number is a multiple of 16.

4. The method of claim 2, wherein the first transaction-specific cryptogram includes an application request cryptogram (ARQC).

5. The method of claim 1, wherein the chip information includes information that relates to a currency code.

6. The method of claim 1, wherein:
   when the transmitted chip information is used by the issuer server to generate a verification code that matches with the transmitted first transaction-specific cryptogram, the received response includes an indication that the transaction is authenticated; and
   when the transmitted chip information is used by the issuer server to generate a verification code that does not match with the transmitted first transaction-specific cryptogram, the received response includes a message indicating that the transaction is not authenticated.

7. The method of claim 1, further comprising
   running an interface application on a smartphone or tablet including a display screen, a keyboard, and a web browser or standalone client application;
   performing communication with the interface application on the smartphone or tablet between the smartphone or tablet and the acquirer server that a) receives in the third data flow the first transaction-specific cryptogram, the chip information, and the transaction information from the point-of-sale terminal, and b) transmits in the fourth data flow the authorization request, the first transaction-specific cryptogram, the chip information, and the transaction information to the network payment server; and
   transmitting from the smartphone or tablet a user request or information to the acquirer server that a) receives in the third data flow the first transaction-specific cryptogram, the chip information, and the transaction information from the point-of-sale terminal, and b) transmits in the fourth data flow the authorization request, the first transaction-specific cryptogram, the chip information, and the transaction information to the network payment server.

8. The method of claim 7, wherein the acquirer server, the payment network server, and the issuer server collectively operate as a plurality of network computing devices within a cluster architecture, or a peer-to peer architecture.

9. The method of claim 8,
   wherein the first-transaction-specific-cryptogram generating operation performs a cryptographic operation on the result of the combining operation using a card-specific key to generate an 8-byte first-transaction-specific-cryptogram, and
   wherein when the first and second transaction-specific cryptograms do not match, then the issuer server does not authenticate the transaction, and transmits a message to the point-of-sale terminal indicating the requested transaction is not authorized.

10. The method of claim 9, wherein the acquirer server processes the first transaction-specific cryptogram, the chip information and the transaction information received in the third data flow with a graphics processing unit denoted as a GPU, an application specific integrated circuit denoted as an ASIC, a digital signal processor denoted as a DSP, a programmable gate array denoted as a PGA, or a field programmable gate array denoted as a FPGA, the payment network server processes the first transaction-specific cryptogram, the chip information and the transaction information received in the fourth data flow with a graphics processing unit denoted as a GPU, an application specific integrated circuit denoted as an ASIC, a digital signal processor denoted as a DSP, a programmable gate array denoted as a PGA, or a field programmable gate array denoted as a FPGA, or the issuer server processes the authorization request, the first transaction-specific cryptogram, the chip information, and the transaction information received in the fifth data flow with a graphics processing unit denoted as a GPU, an application specific integrated circuit denoted as an ASIC, a digital signal processor denoted as a DSP, a programmable gate array denoted as a PGA, or a field programmable gate array denoted as a FPGA.

11. A system comprising a plurality of processors and a plurality of memories storing instructions for instructing the plurality of processors to authenticate a transaction that requires the use of a PIN by performing operations comprising:

i) receiving, by a first processor of the plurality of processors included in a point-of-sale terminal, a request for executing a transaction using a card that includes an embedded chip, comprising
receiving the card at the point-of-sale terminal, and
establishing a first data flow by establishing communication between the card and the point-of-sale terminal using asymmetric keys;

ii) obtaining, by the first processor of the plurality of processors included in the point-of-sale terminal, chip information from the embedded chip, the chip information being card-specific information;

iii) receiving, by the first processor of the plurality of processors included in the point-of-sale terminal, a user input via a keypad that includes at least the PIN identifying the user and input by the keypad in a second data flow;

iv) transmitting, by the first processor of the plurality of processors included in the point-of-sale terminal, the PIN from the point-of-sale terminal to the embedded chip of the card;

v) combining, by a second processor of the plurality of processors included in the embedded chip of the card, the PIN with the chip information and transaction information about the executed transaction, the transaction information including a transaction date, a transaction type, a currency code, and a transaction amount;

vi) generating, by the second processor of the plurality of processors included in the embedded chip of the card, a first transaction-specific cryptogram from the combination of the PIN, the chip information, and the transaction information prior to transmission by performing a message authentication code, denoted as a MAC code, operation on the combination;

vii) transmitting, by the first processor of the plurality of processors included in the point-of-sale terminal, in a third data flow the first transaction-specific cryptogram the chip information, and the transaction information to an acquirer server, and refraining from transmitting the PIN separately from the first transaction-specific cryptogram;

viii) transmitting, by a third processor of the plurality of processors included in the acquirer server, in a fourth data flow, an authorization request including the first transaction-specific cryptogram, the chip information, and the transaction information to a payment network server, requesting an authorization of the transaction based on the generated first transaction-specific cryptogram;

ix) forwarding, by a fourth processor of the plurality of processors included in the payment network server, to an issuer server in a fifth data flow, the authorization request, the first transaction-specific cryptogram, the chip information, and the transaction information; and x) generating, by a fifth processor of the plurality of processors included in the issuer server, a sixth data flow including:
retrieving, from a memory of the issuer server, PIN information, corresponding to the chip information,
generating a second transaction-specific cryptogram, independent of the generating of the first transaction-specific cryptogram, using the received chip information, the received transaction information, and the received PIN information, retrieved from the card information database corresponding to the chip information of the issuer server, and
authenticating the transaction when the first and second transaction-specific cryptograms match and the PIN entered in the second data flow is the same as the PIN information, retrieved by the issuer server in the sixth data flow.

12. A plurality of non-transitory computer-readable mediums storing instructions for instructing a plurality of processors to authenticate a transaction that requires the use of a PIN by performing operations comprising:

i) receiving, by a first processor of the plurality of processors included in a point-of-sale terminal, a request for executing a transaction using a card that includes an embedded chip, comprising
receiving the card at the point-of-sale terminal, and
establishing a first data flow by establishing communication between the card and the point-of-sale terminal using asymmetric keys;

ii) obtaining, by the first processor of the plurality of processors included in the point-of-sale terminal, chip information from the embedded chip, the chip information being card-specific information;

iii) receiving, by the first processor of the plurality of processors included in the point-of-sale terminal, a user input via a keypad that includes at least the PIN identifying the user and input by the keypad in a second data flow;

iv) transmitting, by the first processor of the plurality of processors included in the point-of-sale terminal, the PIN from the point-of-sale terminal to the embedded chip of the card;

v) combining, by a second processor of the plurality of processors included in the embedded chip of the card, the PIN with the chip information and transaction information about the executed transaction, the transaction information including a transaction date, a transaction type, a currency code, and a transaction amount;
vi) generating, by the second processor of the plurality of processors included in the embedded chip of the card, a first transaction-specific cryptogram from the combination of the PIN, the chip information, and the transaction information prior to transmission by performing a message authentication code, denoted as a MAC code, operation on the combination;
vii) transmitting, by the first processor of the plurality of processors included in the point-of-sale terminal, in a third data flow the first transaction-specific cryptogram the chip information, and the transaction information to an acquirer server, and refraining from transmitting the PIN separately from the first transaction-specific cryptogram;
viii) transmitting, by a third processor of the plurality of processors included in the acquirer server, in a fourth data flow, an authorization request including the first transaction-specific cryptogram, the chip information, and the transaction information to a payment network server, requesting an authorization of the transaction based on the generated first transaction-specific cryptogram;
ix) forwarding, by a fourth processor of the plurality of processors included in the payment network server, to an issuer server in a fifth data flow, the authorization request, the first transaction-specific cryptogram, the chip information, and the transaction information; and
x) generating, by a fifth processor of the plurality of processors included in the issuer server, a sixth data flow including:
retrieving, from a memory of the issuer server, PIN information, corresponding to the chip information,
generating a second transaction-specific cryptogram, independent of the generating of the first transaction-specific cryptogram, using the received chip information, the received transaction information, and the received PIN information, retrieved from the card information database corresponding to the chip information of the issuer server, and
authenticating the transaction when the first and second transaction-specific cryptograms match and the PIN entered in the second data flow is the same as the PIN information, retrieved by the issuer server in the sixth data flow.

* * * * *